(12) United States Patent
Shiraishi

(10) Patent No.: US 7,321,378 B2
(45) Date of Patent: Jan. 22, 2008

(54) OPTICAL MULTI-BEAM SCANNING DEVICE AND IMAGE FORMING APPARATUS

(75) Inventor: Takashi Shiraishi, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 239 days.

(21) Appl. No.: 11/048,768

(22) Filed: Feb. 3, 2005

(65) Prior Publication Data

US 2005/0168563 A1  Aug. 4, 2005

(30) Foreign Application Priority Data

Feb. 3, 2004 (JP) .............................. 2004-027268

(51) Int. Cl.
*B41J 2/455* (2006.01)

(52) U.S. Cl. ....................................... 347/233

(58) Field of Classification Search ........ 347/241–244, 347/256–261, 230, 232–235, 248–250, 255; 250/234; 359/583, 629, 640, 389; 360/114.04
See application file for complete search history.

(56) References Cited

U.S. PATENT DOCUMENTS 6,133,566 A * 10/2000 Yamaguchi ................. 250/234

6,381,078 B1    4/2002 Yamaguchi et al.
2004/0218029 A1  11/2004 Shiraishi

FOREIGN PATENT DOCUMENTS

| JP | 63200329 A | * | 8/1988 |
| JP | 7-72407 A | | 3/1995 |
| JP | 10-221618 A | | 8/1998 |
| JP | 11-218699 A | | 8/1999 |
| JP | 11218699 A | * | 8/1999 |

* cited by examiner

*Primary Examiner*—Hai Pham
(74) *Attorney, Agent, or Firm*—Foley & Lardner LLP

(57) ABSTRACT

Unevenness of light quantity caused by angle dependence of transmittance is decreased, and a light beam is shaped. Therefore, a light source 3 which emits the polarized light beam having a long shape and an aperture 10 which narrows the light beam emitted from the light source 3 are provided. An opening 10*a* of the aperture 10 is formed in a long hole shape. A line of apsides direction of the opening 10*a* of the aperture 10 is set to a minor axis direction of the light beam from the light source 3, and the line of apsides direction of the opening 10*a* of the aperture 10 is formed so as to extend to an outside of the area defined by $1/e^2$ for the peak intensity of the laser beam. Polarized directions of the light beams emitted from the light sources 3 are arranged so as to have a symmetric relation or a substantially symmetric relation with respect to a straight line extending toward a sub-scanning direction.

2 Claims, 14 Drawing Sheets

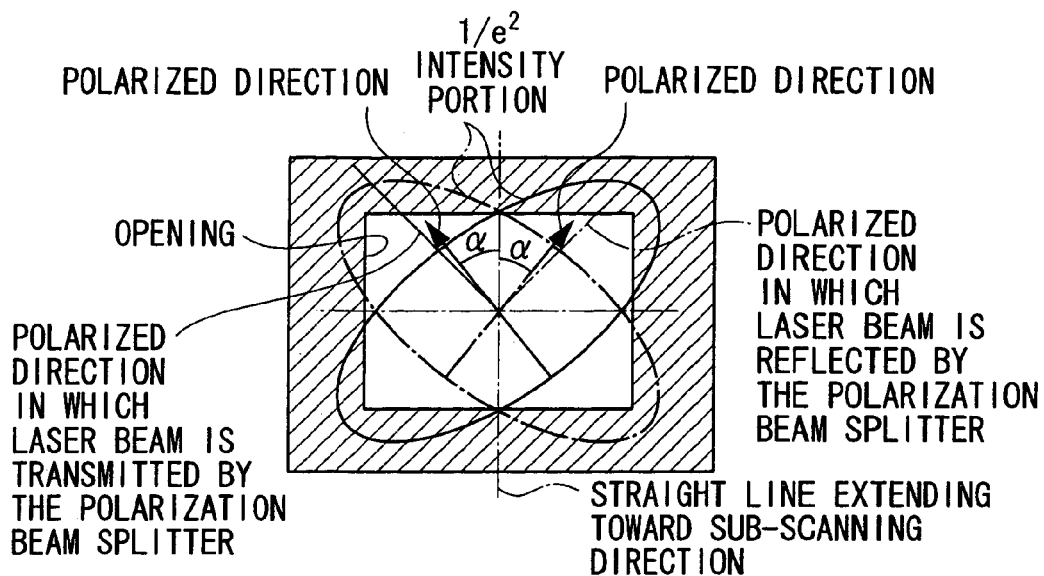
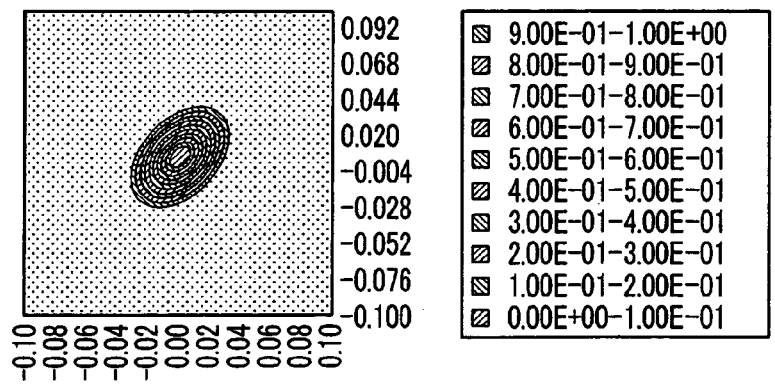
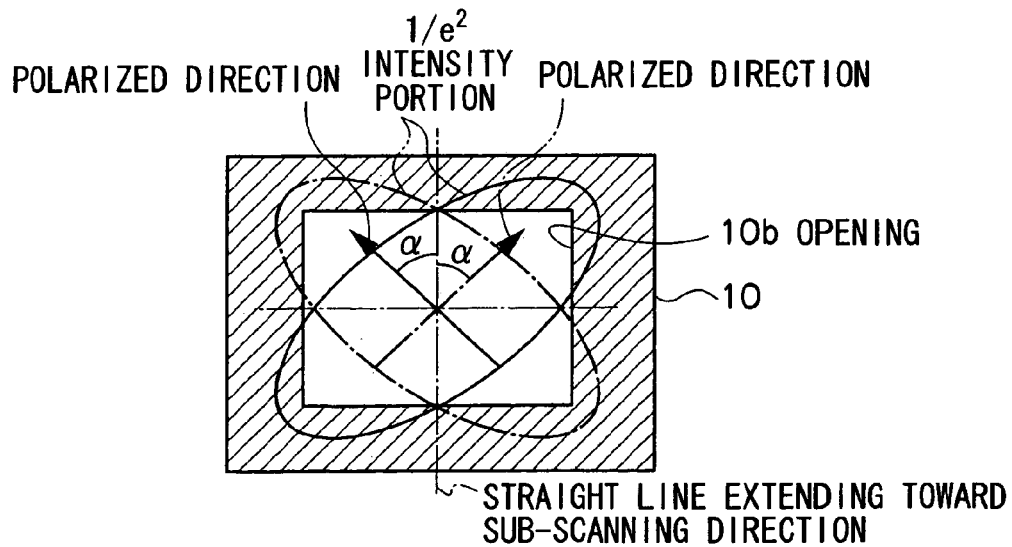

1/e² INTENSITY PORTION

10a OPENING

POLARIZED DIRECTION

STRAIGHT LINE EXTENDING TOWARD SUB-SCANNING DIRECTION

OPTICAL MULTI-BEAM SCANNING DEVICE AND IMAGE FORMING APPARATUS

BACKGROUND OF THE INVENTION

The present invention relates to an optical multi-beam scanning device which scans a plurality of light beams and can be utilized for a multi-drum type color printer, a multi-drum type color copying machine, a high-speed laser printer, a digital copying machine, and the like and an image forming apparatus in which the optical multi-beam scanning device is utilized.

A plurality of image forming units corresponding to color-separated color components and an optical scanning device (laser exposure device) which provides pieces of image data corresponding to the color components, namely the plurality of laser beams to the image forming units are used in the image forming apparatus such as the multi-drum type color printer and the multi-drum type color copying machine.

Usually the optical scanning device includes a semiconductor laser element, a first lens group, an optical deflection device, and a second lens group. The semiconductor laser element is of a light source. The first lens group focuses a beam diameter of the laser beam outgoing from the semiconductor laser element into a predetermined size. The optical deflection device continuously reflects the laser beam focused by the first lens group toward a direction orthogonal to a direction in which a recording medium is conveyed. The second lens group focuses the laser beam deflected by the optical deflection device to a predetermined position of the recording medium. Usually, the direction in which the laser beam is deflected by the optical deflection device is shown as a main scanning direction, and the direction in which the recording medium is conveyed, namely the direction orthogonal to the main scanning direction is shown as a sub-scanning direction.

When the optical scanning device includes the plurality of semiconductor laser elements to output the plurality of laser beams, the laser beams are combined with one another by an optical element to form a close-in beam, and the close-in beam is causes to contribute to formation of a latent image. The optical multi-beam scanning device described in Japanese Patent Application Laid-Open (JP-A) No. 11-218699 (cited document 1) can be cited as an example of the method of combining the plurality of light beams to form the close-in beam.

The optical multi-beam scanning device described in JP-A No. 11-218699 is characterized in that a luminous flux is included in a deflection plane after the luminous flux passes through a polarization beam splitter and the deflection plane is declined from a plane including two luminous fluxes immediately before the two luminous fluxes are incident to the polarization beam splitter. As shown in FIGS. 2A and 2B, the optical multi-beam scanning device includes at least two light-emitting portion 301, a coupling lens 302, an aperture 303, a polarization beam splitter 305, a deflector 308, and an image-formation optical element 309.

The aperture 303 is provided between the coupling lens 302 and the polarization beam splitter 305. An inner hole 303a of the aperture 303 has a shape shown in FIG. 3. Specifically the inner hole 303a of the aperture 303 is formed so as to have the circular shape smaller than a portion where two light beams overlap each other, when beam centers of the two light beams from the light-emitting portions 301 overlap in the center of the inner hole 303a.

Namely, the inner hole 303a of the aperture 303 is set so as to be smaller than a range in which the light beams having substantially oval shapes are combined with each other. That is, the inner hole 303a of the aperture 303 is set so as to be smaller than a range in which the light beams having substantially oval shapes defined by more than $1/e^2$ of peak intensity are overlapped with each other.

However, there are the following problems in the conventional optical multi-beam scanning device.

Since the inner hole 303a of the aperture 303 is formed so as to have the circular shape smaller than the portion where the two light beams from the light-emitting portions 301 overlap each other, more than half of a light quantity from each light-emitting portion 301 is not utilized. Therefore, optical efficiency is decreased and the light from each light-emitting portion 301 cannot effectively be used.

Since a large portion of the incident light beam is rejected by the aperture 303, in consideration of the rejected portion of the light beam, it is necessary to use the light-emitting portion 301 having the large light quantity.

Since radiation angle characteristics depend on the light beam, sometimes the main scanning beam diameter differs from the sub-scanning beam diameter on the image surface. An intensity distribution on the image surface depends on the light beam, and sometimes a size of the line is changed when a thin line is formed only by one beam.

Further, there is also means for combining the light beams by polarizing the light beams with a wave plate. However, in this case, cost is increased because it is necessary that at least two wave plates are inserted into an optical path.

SUMMARY OF THE INVENTION

In order to solve the above-described problems, aperture means and a light beam polarization direction are improved in the invention.

In the aperture means, an opening of the aperture means is formed so as to extend to an outside in a minor axis direction of the oval shape which is defined as the area having intensity not lower than $1/e^2$ of the peak intensity, and the opening of the aperture means is formed so as to be narrowed to an inside in a line of apsides direction of the oval shape.

Therefore, an end portion of the light beam is removed in the line of apsides direction of the oval light beam from light source, and the light beam spreading to the outside of the area of the light beam is taken in the minor axis direction of the oval light beam, so that functional light used for the formation of the latent image is formed. As a result, the beam intensity distributions at the image surface can be formed in the substantially symmetric shape with respect to the main scanning direction and the sub-scanning direction, which allows the problem generated when asymmetry is strong to be eliminated (in writing a straight line during the latent image formation, the problem in that a thickness of the line and depressions and projections of the line are different depending on the direction and image quality is degraded).

The polarized directions of the light beams emitted from the light source are arranged so as to have the symmetric relation or the substantially symmetric relation with respect to the straight line extending toward the sub-scanning direction while the two laser beams are combined by the optical path combining optical element to overlap each other. Further, the polarized directions of the light beams are arranged so as to have the symmetric relation or the substantially symmetric relation with respect to the straight line extending toward both the sub-scanning direction and the main scanning direction. In this case, the light beams are not narrowed by providing the aperture means, and the light beam is directly used as the functional light.

Therefore, in the light beams having the symmetry with respect to the sub-scanning direction or the light beams having the symmetry with respect to both the sub-scanning direction and the main scanning direction, unevenness of light quantity caused by angle dependence of transmittance is decreased between the two light beams combined by the optical path combining optical element.

As described above, in the light beam emitted from the light source except for the end portions in the line of apsides direction, since the functional light is formed by taking in even the outside of the area of the light beam in the minor axis direction, optical efficiency is improved, flare (side lobe) is decreased by forming the beam intensity distributions in the substantially symmetric shape with respect to the sub-scanning direction and the main scanning direction, and the good light beam can be formed. Since an expensive wave plate is not required, cost reduction can be realized.

Further, in the light beams having the symmetry with respect to the sub-scanning direction or the light beams having the symmetry with respect to both the sub-scanning direction and the main scanning direction, since the unevenness of the light quantity caused by the angle dependence of the transmittance can be decreased, both when the latent image is formed in a single drum with the plurality of light beams and when the same latent images are formed in parallel in the plurality of drums, a fluctuation in thickness of the lines formed in parallel on the surface of the drum by each laser beam is not generated, and the thicknesses of the lines can be caused to be even. A phenomenon which is caused by a post-deflection optical system and in which the transmittance is decreased as a deflection angle is increased can be suppressed.

In this case, since the light beams are not narrowed by providing the aperture means, the decrease in transmittance can be minimized. Since the expensive wave plate is not required, the cost reduction can be realized.

BRIEF DESCRIPTION OF THE DRAWINGS

FIG. 7 is also a schematic view showing states of a first laser beam to a fourth laser beam toward the optical deflection device;

FIG. 13 is a plan view showing the aperture according to another embodiment of the invention;

FIG. 19 is a plan view showing the aperture according to another embodiment of the invention;

FIG. 20 is a graph showing the image surface beam intensity distribution by the aperture according to another embodiment of the invention;

DETAILED DESCRIPTION OF THE PREFERRED EMBODIMENTS

Referring to the accompanying drawings, embodiments of the invention will be described below. An optical multi-beam scanning device and an image forming apparatus according to the embodiments can be utilized for a multi-drum type color printer, a multi-drum type color copying machine, a high-speed laser printer, a digital copying machine, a single-drum type monochrome printer, and the like. In the following description, the multi-drum type color printer in which the four-light beam or eight-optical scanning device is utilized will be described as a first embodiment, and the single-drum type monochrome printer (monochrome image forming apparatus) in which the two-beam optical scanning device is utilized will be described as a second embodiment.

First Embodiment

First, the multi-drum type color printer will be described.

Figure 4:
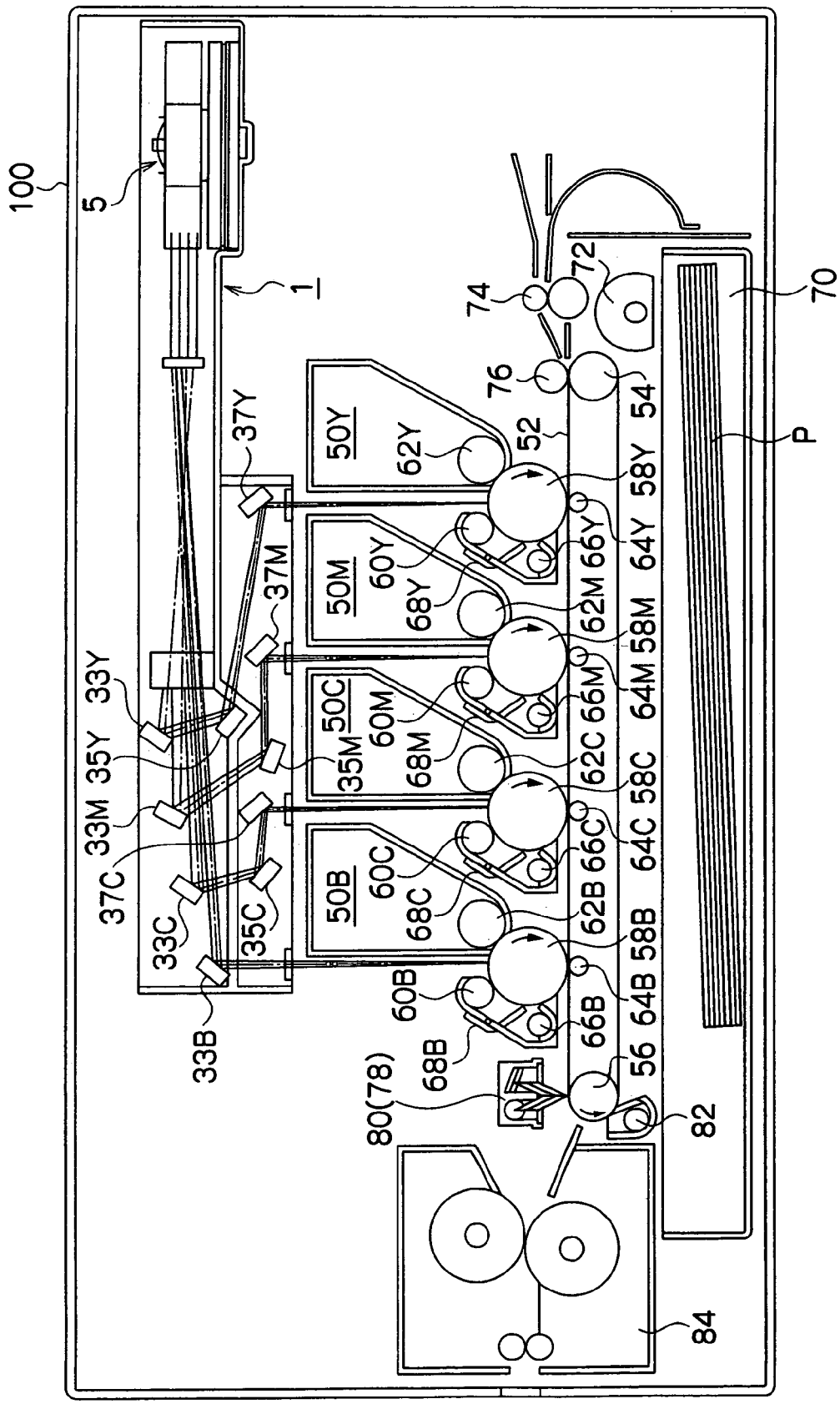
FIG. 4 is a schematic sectional view of an image forming apparatus in which an optical multi-beam scanning device according to an embodiment of the invention is utilized.

FIG. 4 shows the multi-drum type color printer according to a first embodiment of the invention. Usually various kinds of four sets of devices, which form four kinds of image data and the image in each color component, are used in this kind of multi-drum type color printer. The image data is color-separated into each color component of Y (Yellow), M (Magenta), C (Cyan), and B (Black). The image is formed in each color component corresponding to Y, M, C, and B. Therefore, the image data in each color component and the device corresponding to each color component are identified by adding Y, M, C, and B to each reference numeral.

As shown in FIG. 4, a color printer 100 includes first to fourth image forming units 50Y, 50M, 50C, and 50B in which the image is formed in each color-separated color component, namely in each of Y, M, C, and B.

The image forming units 50Y, 50M, 50C, and 50B are sequentially arranged in line below an optical multi-beam scanning device 1 so as to correspond to positions to which laser beams LY, LM, LC, and LB corresponding respectively to the color component images are incident through third reflecting mirrors 37Y, 37M, and 37C and a first reflecting mirror 33B in the optical multi-beam scanning device 1 which is mentioned below referring to FIGS. 5 to 9.

A conveyance belt 52 which conveys the image formed by each of the image forming units 50Y, 50M, 50C, and 50B is arranged beneath the image forming units 50Y, 50M, 50C, and 50B.

The conveyance belt 52 is entrained about a belt driving roller 56 and a tension roller 54. The belt driving roller 56 is rotated in an arrow direction by a motor (not shown), and the conveyance belt 52 is rotated at predetermined velocity in the direction in which the belt driving roller 56 is rotated.

Each of the image forming units 50Y, 50M, 50C, and 50B is formed in a cylindrical drum shape while can be rotated in an arrow direction. The image forming units 50Y, 50M, 50C, and 50B respectively have photoconductor drums 58Y, 58M, 58C, and 58B on which an electrostatic latent image corresponding to each image is formed by an optical scanning device and its laser beam.

A charging device 60 (Y, M, C, and B), a development device 62 (Y, M, C, and B), a transfer device 64 (Y, M, C, and B), a cleaner 66 (Y, M, C, and B), and a charge removal device 68 (Y, M, C, and B) are arranged around each of the photoconductor drums 58Y, 58M, 58C, and 58B in the order along the rotating direction of the photoconductor drum 58. The charging device 60 provides a predetermined potential to a surface of the photoconductor drum 58. The development device 62 performs development by providing color toner corresponding to an electrostatic latent image formed on the surface of the photoconductor drum 58. The transfer device 64 is opposed to the photoconductor drum 58 through the conveyance belt 52, and the transfer device 64 transfers a toner image on the photoconductor drum 58 to the conveyance belt 52 or the recording medium, namely recording paper P conveyed through the conveyance belt 52. The cleaner 66 removes the toner remaining on the photoconductor drum 58 after the toner image is transferred through the transfer device 64. The charge removal device 68 removes the potential remaining on the photoconductor drum 58 after the toner image is transferred through the transfer device 64.

The laser beams LY, LM, LC, and LB are formed by combining the two laser beams respectively. The combined laser beams LY, LM, LC, and LB are guided onto the photoconductor drum 58 by the mirrors 37Y, 37M, 37C, and 33B and divided into two beams in the sub-scanning direction respectively. Each of the laser beams LY, LM, LC, and LB is incident between the charging device 60 and the development device 62.

A paper cassette 70 is arranged below the conveyance belt 52. The recording medium, namely the recording paper P, to which the image formed by the image forming unit 50 is transferred, is stored in the paper cassette 70.

A generally semilunar shaped paper feed roller 72 is arranged at one end of the paper cassette 70 and on the side close to the tension roller 54. The paper feed roller 72 takes out the recording paper P stored in the paper cassette 70 one by one from a top of a stack of recording paper P. A registration roller 74 is arranged between the paper feed roller 72 and the tension roller 54. The registration roller 74 aligns a front end of one piece of recording paper P taken out from the paper cassette 70 and a front end of the toner image formed on the photoconductor drum 58B in the image forming unit 50B.

An absorption roller 76 is arranged between the registration roller 74 and the first image forming unit 50Y, and the absorption roller 76 is in contact with an outer periphery of the tension roller 54 through the conveyance belt 52. The absorption roller 76 provides predetermined electrostatic absorption force to one piece of recording paper P conveyed at predetermined timing through the registration roller 74. An axis line of the absorption roller 76 and the tension roll 54 are arranged in parallel.

Registration sensors 78 and 80 are arranged on one end of the conveyance belt 52 while the registration sensors 78 and 80 and the belt driving roller 56 sandwich the conveyance belt 52. The registration sensors 78 and 80 are arranged while separated from each other in the direction of a shaft of the belt driving roller 56 (only the rear sensor 80 is shown because FIG. 4 is a front sectional view). The registration sensors 78 and 80 sense the position of the image formed on the conveyance belt 52 or the recording paper P conveyed by the conveyance belt 52.

A conveyance belt cleaner 82 is arranged while the conveyance belt cleaner 82 and the belt driving roller 56 sandwich the conveyance belt 52. The conveyance belt cleaner 82 removes the toner adhering to the conveyance belt 52 or paper dust of the recording paper P.

A fixing device 84 is arranged in the direction in which the recording paper P conveyed through the conveyance belt 52 is separated from the tension roller 56 and further conveyed. In the fixing device 84, the toner image transferred to the recording paper P is fixed to the recording paper P.

Figure 5:
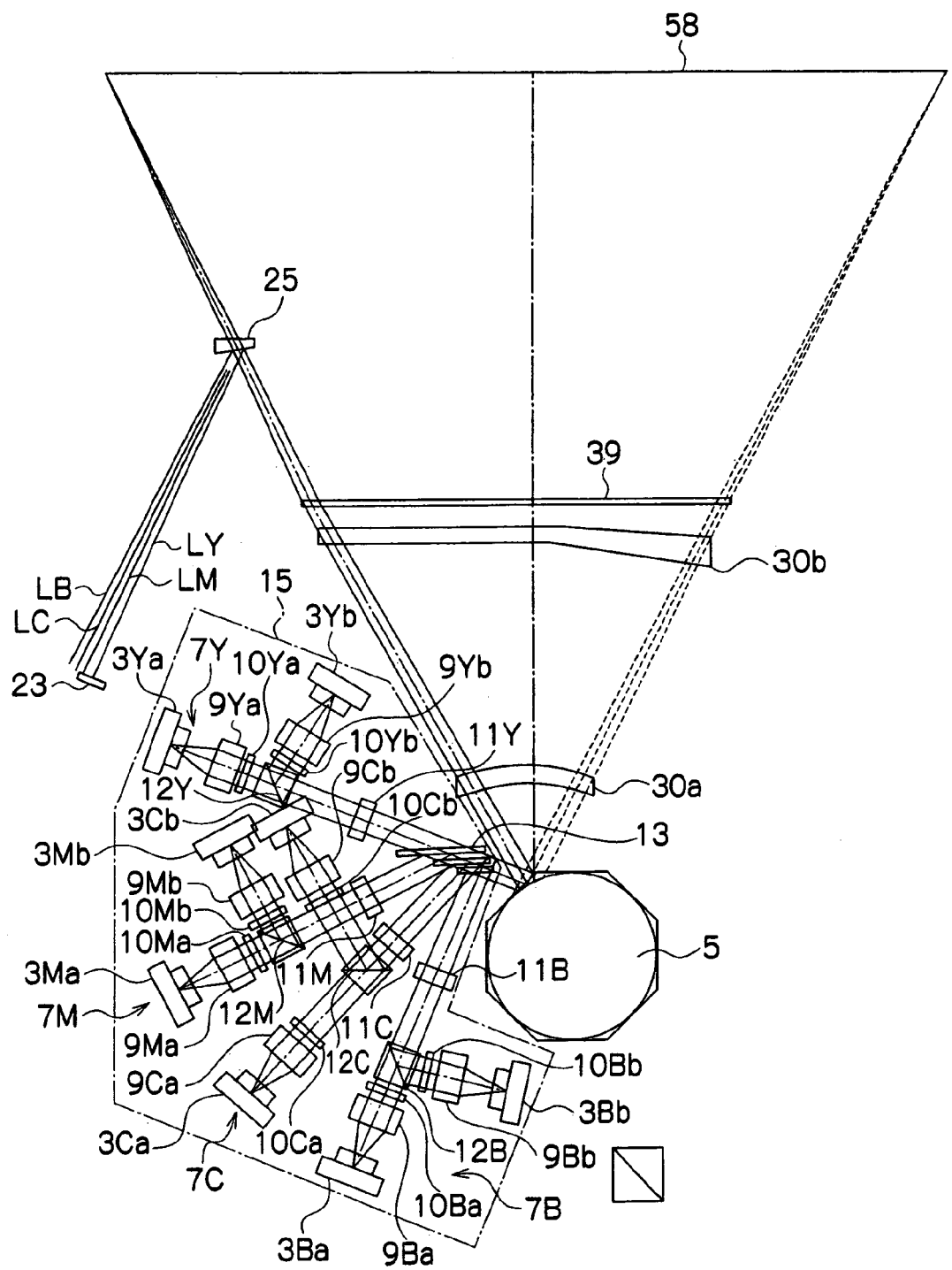
FIG. 5 is a schematic plan view showing an arrangement of optical members of the optical multi-beam scanning device incorporated into the image forming apparatus shown in FIG. 4.

FIG. 5 shows the optical multi-beam scanning device used for the color image forming apparatus shown in FIG. 4.

Usually the four sets of devices, which form four kinds of image data color-separated into each color component of Y, M, C, and B and the image in each color component corresponding to Y, M, C, and B, are used in the image forming apparatus shown in FIG. 4. Therefore, as with FIG. 4, the image data in each color component and the device corresponding to each color component are identified by adding Y, M, C, and B to each reference numeral.

As shown in FIG. 5, the optical multi-beam scanning device 1 includes only one optical deflection device 5 which is of deflection means. The deflection means deflects the laser beam outgoing from the laser element which is of the light source at predetermined linear velocity toward the image surface arranged at the predetermined position, namely each predetermined position of the photoconductor drums 58Y, 58M, 58C, and 58B in the first to fourth image forming units 50Y, 50M, 50C, and 50B shown in FIG. 4. Hereinafter the direction in which the laser beam is deflected by the optical deflection device 5 will be shown as the main scanning direction.

The optical deflection device 5 includes a polygon mirror main body 5a and a motor (not shown). In the polygon mirror main body 5a, eight planar reflecting mirrors are arranged in a regular polygon shape. The motor rotates the polygon mirror main body 5a in the main scanning direction at a predetermined velocity. For example, the polygon mirror main body 5a is made of aluminum. Each reflecting surface of the polygon mirror main body 5a is cut along the surface including the direction in which the polygon mirror main body 5a is rotated, namely the surface orthogonal to the main scanning direction, namely the sub-scanning direction. Then, a surface protection layer such as $SiO_2$ is evaporated on the cut surface to form the polygon mirror main body 5a.

A post-deflection optical system 30 including first and second image-formation lenses 30a and 30b, only one horizontal synchronization detector 23, only one horizontal synchronization reflecting mirror 25, and the like are arranged between the light deflecting device 5 and the image surface. The first and second image-formation lenses 30a and 30b impart predetermined optical characteristics to the laser beam deflected toward the predetermined direction by the reflecting plane of the optical deflection device 5. The horizontal synchronization detector 23 detects that each of the combined laser beams LY, LM, LC, and LB outgoing from the second image-formation lens 30b in the post-deflection optical system 30 reaches the predetermined position located in front of an area where the image is written. The horizontal synchronization reflecting mirror 25 is arranged between the post-deflection optical system 30 and the horizontal synchronization detector 23. A part of the four by two-combined laser beam L (Y, M, C, and B) passing through at least one lens in the post-deflection optical system 30 is reflected toward the horizontal synchronization detector 23 by the horizontal synchronization reflecting mirror 25.

In the part of the four by two-combined laser beam L reflected by the horizontal synchronization reflecting mirror 25, both the laser beam in the main scanning direction and the laser beam in the sub-scanning direction are reflected toward the horizontal synchronization detector 23.

Then, a pre-deflection optical system arranged between the laser element which is of the light source and the optical deflection device 5 will be described in detail.

The light-beam scanning device 1 has first to fourth light sources 3Y, 3M, 3C, and 3B (M: M is a positive integer, and M is 4 in this case) which generate the laser beams corresponding to the image data color-separated into the color components. Each of the first to fourth light sources 3Y, 3M, 3C, and 3B includes first and second (N1=N2=N3=N4=2) laser elements which satisfy Ni (i is a positive integer).

The first to fourth light sources 3Y, 3M, 3C, and 3B have a yellow first laser 3Ya and a yellow second laser 3Yb corresponding to Y, namely the yellow image, a magenta first laser 3Ma and a magenta second laser 3Mb corresponding to M, namely the magenta image, a cyan first laser 3Ca and a cyan second laser 3Cb corresponding to C, namely the cyan image, and a black first laser 3Ba and a black second laser 3Bb corresponding to B, namely the black image respectively. Each pair of laser beams LYa and LYb, LMa and LMb, LCa and LCb, or LBa and LBb is emitted from the first and second laser elements.

Pre-deflection optical systems 7Y, 7M, 7C, and 7B are arranged between the laser elements 3Ya, 3Ma, 3Ca, and 3Ba and the optical deflection device 5 respectively. The pre-deflection optical system 7 arrange each cross-sectional beam spot shape of laser beams LYa, LMa, LCa, and LBa from the light sources 3Ya, 3Ma, 3Ca, and 3Ba into a predetermined shape.

The pre-deflection optical system 7Y will be described by using the laser beam LYa from the yellow first laser 3Ya toward the optical deflection device 5, which represents the laser beams L.

A finite focal point lens 9Ya imparts predetermined convergence to the divergent laser beam emitted from the yellow first laser 3Ya, and an aperture 10Ya arranges the cross-sectional beam shape into the predetermined shape mentioned later. In the laser beam LYa passing through the aperture 10Ya, the predetermined convergence is further imparted only to the sub-scanning direction through the hybrid cylindrical lens 11Y, and then the laser beam LYa is guided to the optical deflection device 5.

A polarization beam splitter 12Y is inserted between the finite focal point lens 9Ya and the hybrid cylindrical lens 11Y. The polarization beam splitter 12Y is described in detail later. A finite focal point lens 9Yb and an aperture 10Yb are arranged between the yellow second laser 3Yb and the polarization beam splitter 12Y. The finite focal point lens 9Yb and the aperture 10Yb impart the predetermined convergence to the laser beam LYb emitted from the yellow second laser 3Yb.

The laser beams LYa and LYb are substantially combined in one laser beam through the polarization beam splitter 12Y. The laser beams LYa and LYb have a predetermined beam distance in the sub-scanning direction. Each of the laser beams LYa and LYb passes through a laser combining mirror unit 13 which is described later referring to FIG. 9 and is guided to the optical deflection device 5.

As with the case of the laser beam LYa, with reference to M (Magenta), a finite focal point lens 9Ma, an aperture 10Ma, a hybrid cylindrical lens 1M, a polarization beam splitter 12M, a magenta second laser 3Mb, a finite focal point lens 9Mb, and an aperture 10Mb are arranged in positions between the magenta first laser 3Ma and the laser combining mirror unit 13. With reference to C (Cyan), a finite focal point lens 9Ca, an aperture 10Ca, a hybrid cylindrical lens 1C, a polarization beam splitter 12C, a cyan second laser 3Cb, a finite focal point lens 9Cb, and an aperture 10Cb are arranged in positions between the cyan first laser 3Ca and the laser combining mirror unit 13. With reference to B (Black), a finite focal point lens 9Ba, an aperture 10Ba, a hybrid cylindrical lens 11B, a polarization beam splitter 12B, a magenta second laser 3Bb, a finite focal point lens 9Bb, and an aperture 10Bb are arranged in positions between the black first laser 3Ba and the laser combining mirror unit 13. The light source 3, the pre-deflection optical system 7, and the laser combining mirror unit 13 are integrally held by a holding member 15 made of an aluminum alloy or the like.

A single lens in which a UV cure plastic aspheric lens (not shown) is bonding to a spherical glass lens or an aspherical glass lens is used as the finite focal point lens 9a and the finite focal point lens 9b.

Figure 6:
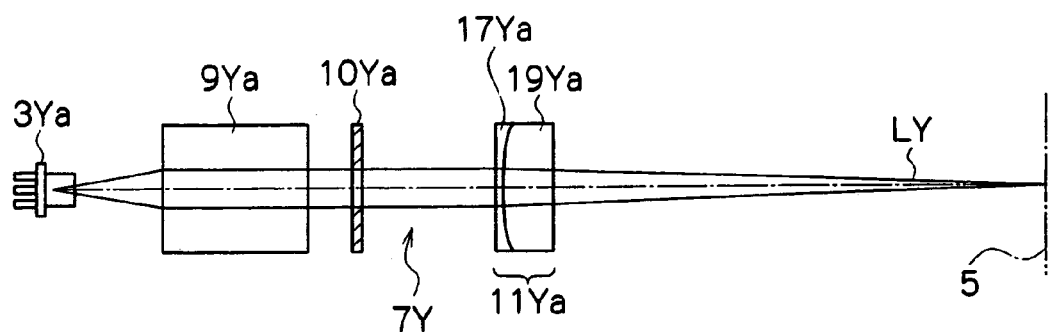
FIG. 6 is a partially sectional view of the optical scanning device shown in FIG. 5 when the optical scanning device is taken along an optical axis of a system between a first light source and an optical deflection device.

FIG. 6 is a partially sectional view showing an optical path between the reflecting surfaces of the polarization beam splitter 12 and the optical deflection device 5 in the pre-deflection optical system 7 when the optical path is viewed from the sub-scanning direction while the reflecting mirror and the like are omitted. In FIG. 6, only the optical components for one laser beam LY (LYa) are shown as a representative.

The hybrid cylindrical lens 11Ya is formed by a PMMA cylindrical lens 17Ya and a glass cylindrical lens 19Ya. The cylindrical lens 17Ya and the cylindrical lens 19Ya have the substantially even curvature in the sub-scanning direction.

In the PMMA cylindrical lens 17Ya, the surface which is in contact with air is substantially formed in the plane.

Figure 7:
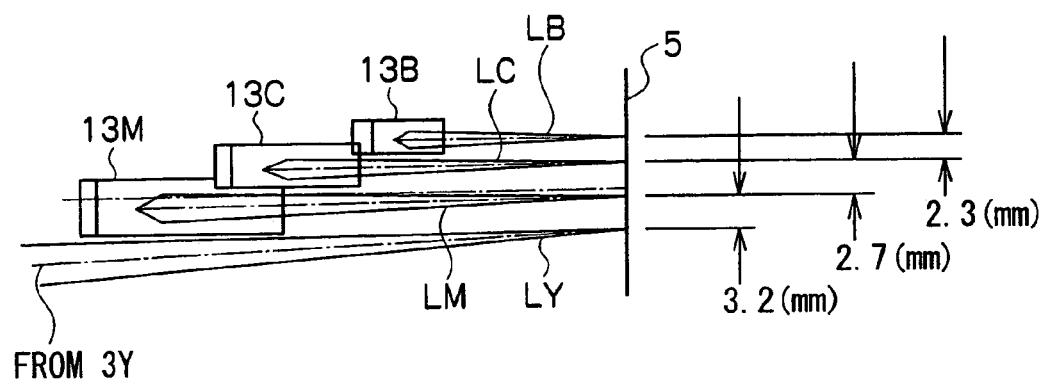
FIG. 7 is a partially sectional view of the optical scanning device shown in FIG. 5 in a sub-scanning direction.

FIG. 7 shows the laser beams LM, LC, and LB in the range from reflecting surfaces 13M, 13C, and 13B of the laser combining mirror unit 13 to the optical deflection device 5 in the pre-deflection optical system 7 shown in FIG. 6. The laser beams LM, LC, and LB are incident to the reflecting surface of the optical deflection device 5 from the direction (sub-scanning direction) orthogonal to the rotating axis of the reflecting surface of the optical deflection device 5. LY includes LYa and LYb, LM includes LMa and LMb, LC includes LCa and LCb, and LB includes LBa and LBb.

As can be seen from FIG. 7, the laser beams LY, LM, LC, and LB are guides to the optical deflection device 5 with different intervals in the direction parallel to the rotating axis of the reflecting surface of the optical deflection device 5. The laser beams LM and LC are guided to the reflecting surface of the optical deflection device 5 in an asymmetrical manner with respect to the plane which includes the center of the sub-scanning direction of the reflecting surface while being orthogonal to the rotating axis of the reflecting surface of the optical deflection device 5, namely the plane which includes the optical axis of the system of the optical multi-beam scanning device 1. For the distance among the laser beams LY, LM, LC, and LB on each of the reflection surfaces of the optical deflection device 5, the distance between LY and LM is 3.20 mm, the distance between LM and LC is 2.70 mm, and the distance between LC and LB is 2.30 mm.

Figure 8:
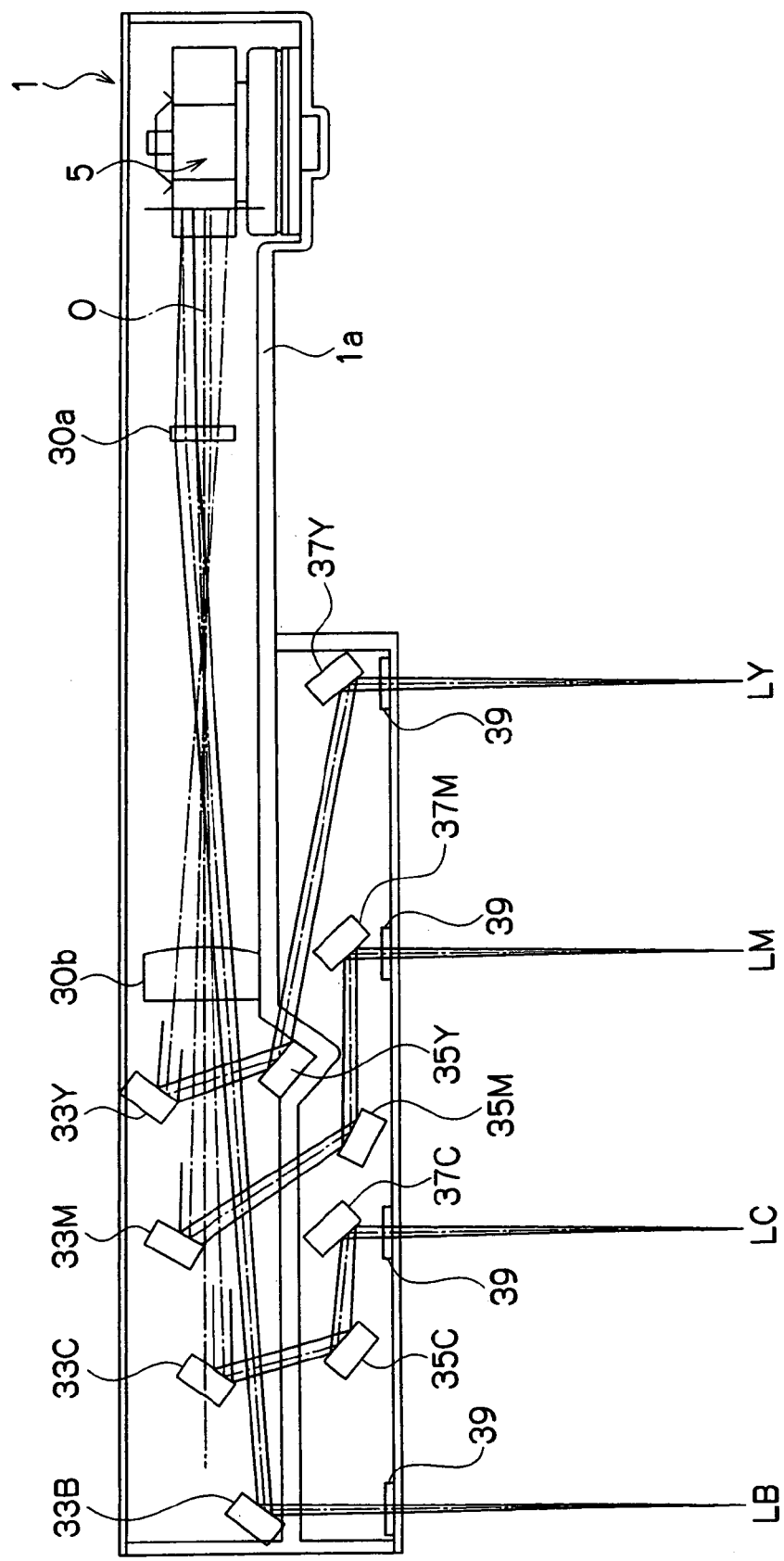
FIG. 8 is a schematic sectional view of the optical scanning device shown in FIG. 5 when the optical scanning device is taken at a position where a deflection angle of the optical deflection device is 0°.

FIG. 8 shows the optical components arranged between the optical deflection device 5 and the photoconductor drum 58, namely the image surface in the optical multi-beam scanning device 1 when the optical multi-beam scanning device 1 is viewed in the sub-scanning direction at the position where a deflection angle of the optical deflection device 5 is 0°.

As shown in FIG. 8, first reflecting mirrors 33Y, 33M, 33C, and 33B, second reflecting mirrors 35Y, 35M, and 35C, and third reflecting mirrors 37Y, 37M, and 37C are arranged between the second image-formation lens 30b of the post-deflection optical system 30 and the image surface. The first reflecting mirrors 33Y, 33M, 33C, and 33B reflect the four by two laser beams LY, LM, LC, and LB passing through the second image-formation lens 30b toward the image surface.

The second reflecting mirrors 35Y, 35M, and 35C, and the third reflecting mirrors 37Y, 37M, and 37C further reflect the laser beams LY, LM, and LC reflected from the first reflecting mirrors 33Y, 33M, and 33C. As can be seen from FIG. 8, the laser beam LB corresponding to the B (black) image is reflected from the first reflecting mirror 33B and guided to the image surface without being reflected by other mirrors.

Dust-proof glasses 39Y, 39M, 39C, and 39B which protect the inside of the optical multi-beam scanning device 1 from the dust are arranged at the position between the image surface and the third reflecting mirrors 37Y, 37M, and 37C and the first reflecting mirror 33B and at the position where the eight (four by two) laser beams LY, LM, LC, and LB reflected from the third reflecting mirrors 37Y, 37M, and 37C and the first reflecting mirror 33B are output from the optical multi-beam scanning device 1.

Figure 9:
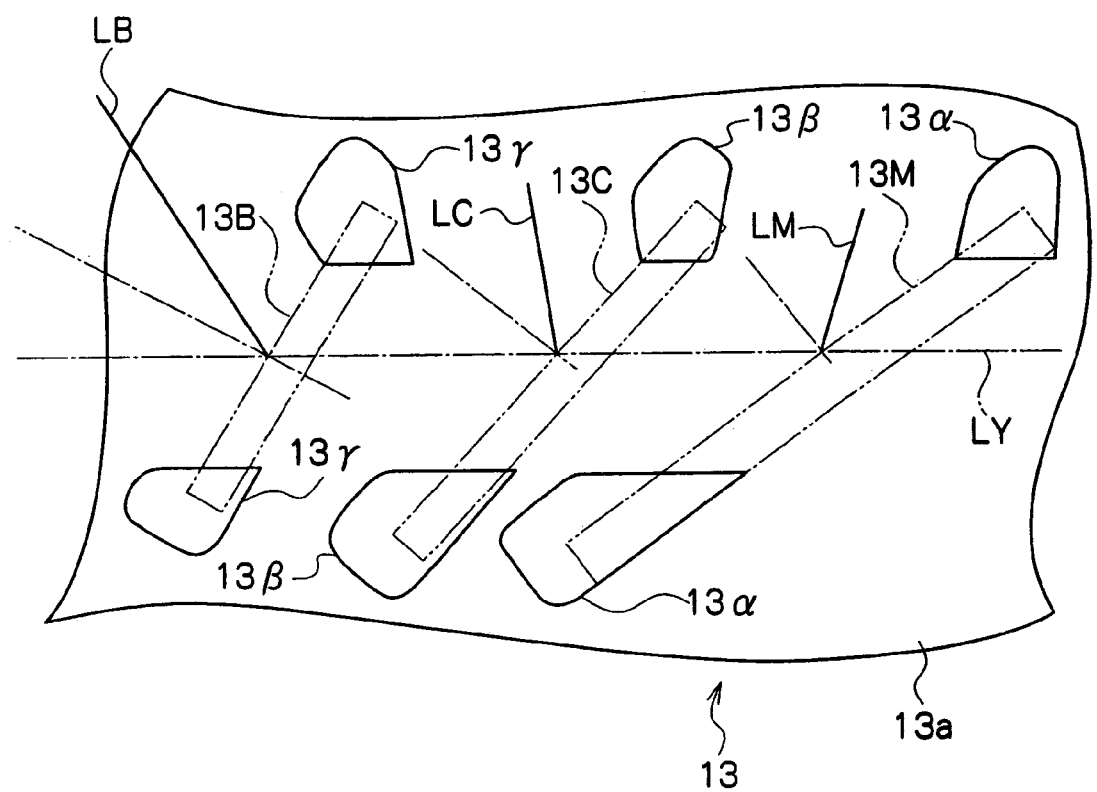
FIG. 9 is a plan view and a side view showing a laser beam combining mirror unit of the optical scanning device shown in FIG. 5.

FIG. 9 shows the laser combining mirror unit 13 which guides the first to fourth combined laser beams LY, LM, LC, and LB as one bundle of the laser beam to each reflecting surface of the optical deflection device 5.

The laser combining mirror unit 13 includes first to third mirrors 13M, 13C, and 13B, first to third mirror holding portion 13α, 13β, and 13γ, and a base 13a. The number of mirrors is smaller than the number of image-formable color components (the number of color-separated colors) by one. The first to third mirror holding portion 13α, 13β, and 13γ hold the first to third mirrors 13M, 13C, and 13B. The base 13a holds the first to third mirror holding portion 13α, 13β, and 13γ. As described above, the laser beams LY emitted from the light source 3Y, namely the yellow first laser 3Ya and the yellow second laser 3Yb are directly guided to the reflecting surfaces of the optical deflection device 5.

Then, a relationship among the laser beams L reflected from the polygon mirror 5a of the optical deflection device 5, a gradient of each of the laser beams LY, LM, LC, and LB output to the outside of the optical multi-beam scanning device 1 through the post-deflection optical system 30, and the reflecting mirrors 33B, 37Y, 37M, and 37C will be described referring to FIGS. 5 and 8.

As described above, the laser beams LY, LM, LC, LB which are reflected from the polygon mirror 5a of the optical deflection device 5 and to which the predetermined aberration characteristics are imparted by the first and second image-formation mirrors 30a and 30b are reflected toward the predetermined directions through the first reflecting mirrors 33Y, 33M, 33C, and 33B.

At this point, the laser beam LB is reflected by the first reflecting mirror 33B and directly guided to the photoconductor drum 58b through the dust-proof glass 39B. On the other hand, the laser beams LY, LM, and LC are guided to the second reflecting mirrors 35Y, 35M, and 35C and reflected toward the third reflecting mirrors 37Y, 37M, and 37C by the second reflecting mirrors 35Y, 35M, and 35C. Then, the laser beams LY, LM, and LC are reflected by the third reflecting mirrors 37Y, 37M, and 37C and focused onto the photoconductor drums at substantially even intervals by the dust-proof glasses 39Y, 39M, and 39C. In this case, the laser beam LB reflected by the first reflecting mirror 33B and the laser beam LC adjacent to the laser beam LB are focused onto the photoconductor drums at substantially even intervals.

The laser beam LB is reflected only by the reflecting mirror 33B and output toward the photoconductor drum 58 from the optical multi-beam scanning device 1 after deflected by the polygon mirror 5a. Therefore, the laser beam LB which is substantially guided only by one reflecting mirror 33B can be secured.

Figure 10:
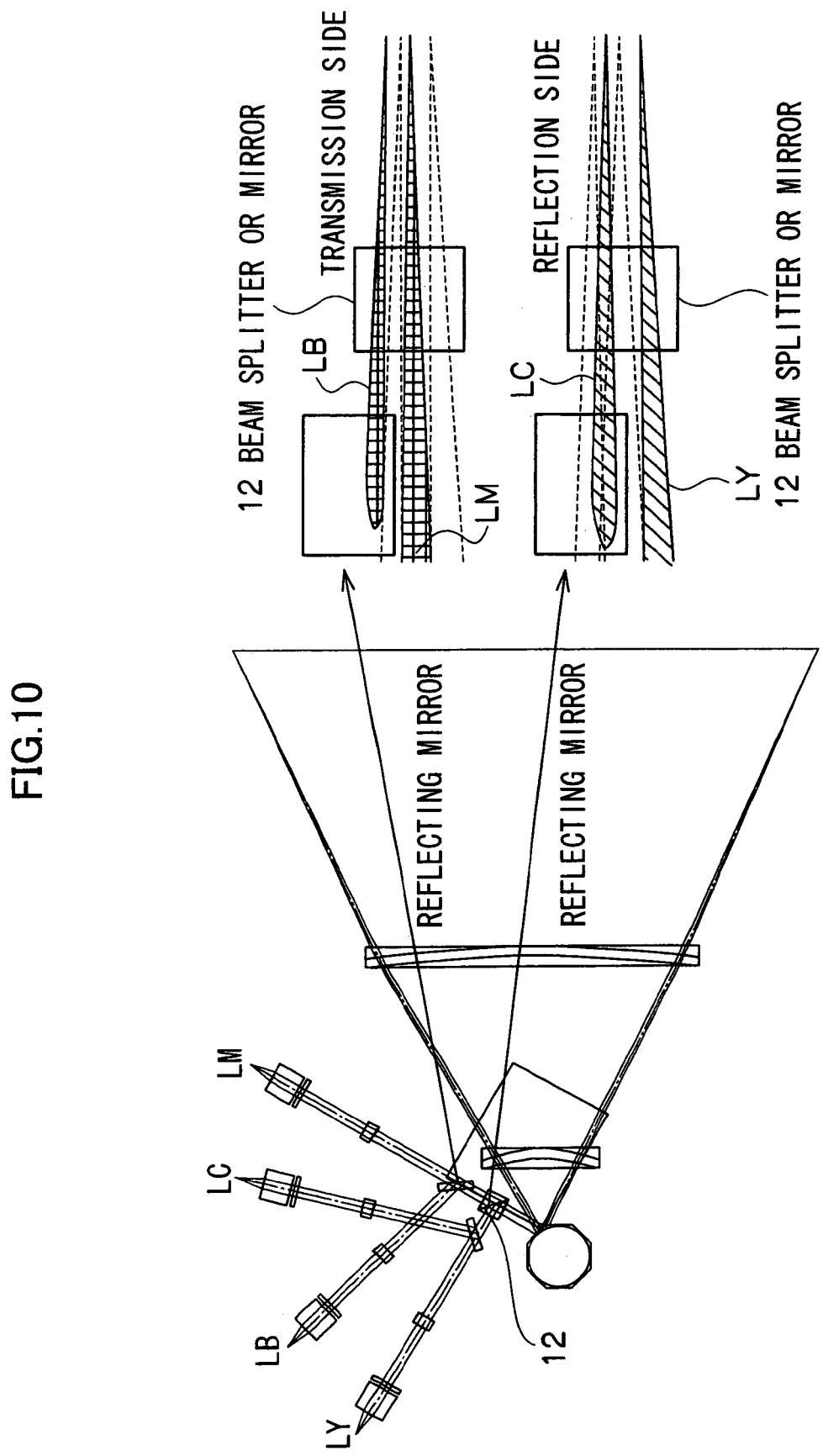
FIG. 10 is a schematic side view showing a four-light beam scanning apparatus.

The optical multi-beam scanning device 1 includes eight light sources 3, and the combination at the polarization beam splitter is performed with the light beams which form the same latent image. As shown in FIG. 10, it is possible that the combination of the light beams which form the different images is performed by the polarization splitter.

In this case, as with the optical multi-beam scanning device 1, the light beams are formed by the four kinds of light beams LY, LM, LC, and LB.

Junction surfaces of the plurality of laser diodes which emit the light beams LB and LM are inclined toward the same direction with respect to the sub-scanning direction. The junction surfaces of the plurality of laser diodes which emit the light beams LC and LY are inclined toward the opposite direction to the junction surfaces of the plurality of laser diodes which emit the light beams LB and LM with respect to the sub-scanning direction, while the inclined angle of the junction surfaces of the plurality of laser diodes which emit the light beams LB and LM is equal to the inclined angle of the junction surfaces of the plurality of laser diodes which emit the light beams LC and LY. The light beams LB and LM and the light beams LC and LY are incident to an optical path combining optical element 12 having a polarization beam splitter surface which outputs the light beam whose polarized direction is inclined by 45 degrees with respect to the sub-scanning direction. Since the polarized direction is parallel to the direction in which the junction surface extends, the polarized directions of the laser beams LB, LM, LC, and LY become symmetrical with respect to the sub-scanning direction.

The light beams LB and LM emitted from the laser diodes whose junction surfaces are inclined toward the same direction are incident to one of the polarization beam splitter surfaces with different heights in the sub-scanning direction in each light beam which forms a different latent image. The light beams LC and LY emitted from the second laser diodes whose junction surfaces are inclined toward the opposite direction are incident to the opposite surface of the polarization beam splitter surfaces with different heights in the sub-scanning direction in each light beam which forms the different latent image. The polarized directions of the light beams, which are adjacent to one another on the polarization beam splitter surface and form the different latent images, are arranged so as to be different from one another.

Therefore, before the light beams LB and LM and the laser beams LC and LY are incident to the polarization beam splitter, the interval between the laser beams can be broadened in the sub-scanning direction at the position where the normal mirror is arranged in order to combine the main scanning direction optical paths by reflecting the light beams LB and LM and the laser beams LC and LY toward the main scanning direction with the normal mirror. Further, more than 50% of transmittance and more than 50% reflectance can be obtained in the light beams LB and LM and the laser beams LC and LY.

It is also possible that the optical multi-beam scanning device 1 has the eight light sources 3 and has the configuration shown in FIG. 10 after the laser beams are combined with a half mirror. In this case, since the polarized directions of the light beams which form the same latent image are aligned, in the laser diodes which emit the light beam for forming the same latent image, the junction surfaces are inclined toward the same direction from the sub-scanning direction.

In the multi-drum type color printer having the above-described configuration, the aperture 10 is particularly improved in the embodiment. In this case, the light beams are dealt with by the aperture 10 without using a wave plate.

The light source 3 includes a laser diode array which emits the polarized long light beam. Specifically, the light beam emitted from the laser diode array becomes the light beams having an oval shape (see FIG. 1), and the polarized direction of the light beam is orientated toward the direction in which the radiation angle is small (a minor axis direction).

Figure 11:
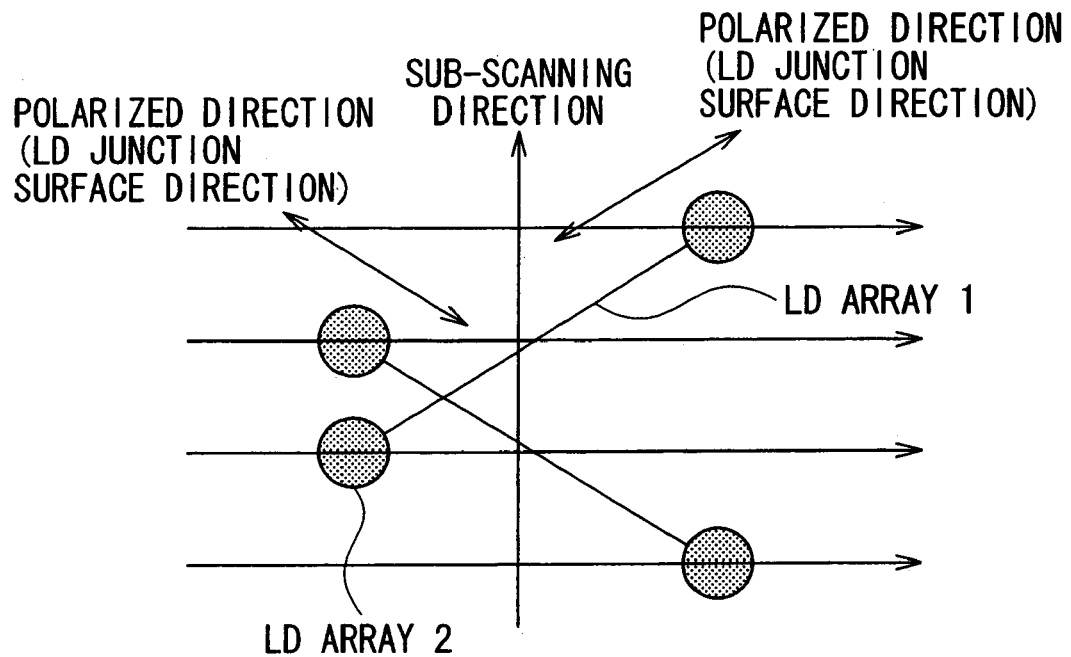
FIG. 11 is a schematic view showing an example of the arrangement of a laser diode array.

FIG. 11 shows the arrangement of light-emitting points of the two laser diode arrays. In FIG. 11, the light-emitting points of the two laser diode arrays overlap each other so that the polarized directions of the two laser diode arrays have the same angle with respect to the sub-scanning direction and the polarized directions are opposite to each other. Specifically the two laser diode arrays are arranged so that the polarized directions of the two laser beams, which are emitted from the two laser diode arrays and combined, become a symmetric relation or a substantially symmetric relation with respect to the straight line extending toward the sub-scanning direction while combined by the polarization beam splitter 12 to overlap each other.

Figure 12:
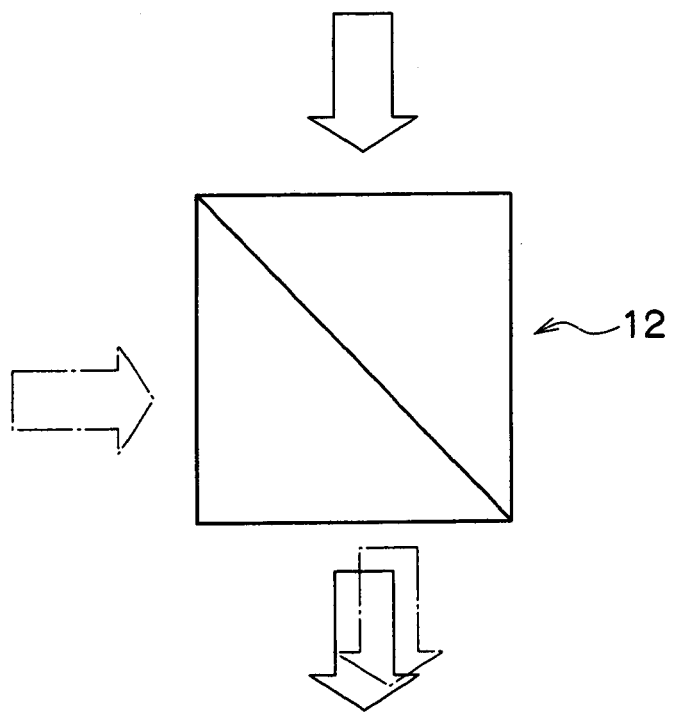
FIG. 12 is a side view showing a polarization beam splitter.

The polarization beam splitter 12 is the optical path combining optical element, and the polarization beam splitter 12 is formed as shown in FIG. 12. Specifically, the polarization beam splitter 12 is formed by bonding two prisms, and a boundary surface of each prism becomes the polarization beam splitter surface. The polarization beam splitter surface transmits incident light beam which is incident to the polarization beam splitter surface at a polarizing angle of 45° with respect to the straight line extending toward the sub-scanning direction, and the polarization beam splitter surface does not transmit the incident light beam having the polarizing angle perpendicular to the polarizing angle of the transmitted light beam. The polarization beam splitter surface which is of the optical element having polarization dependence can be formed by a plane coated with a dielectric material. It is possible that the polarization beam splitter 12 is formed by a dielectric cube beams splitter. When the two laser beams are combined by using the half mirror which is of the optical path combining optical element, it is possible to use the mirror coated with the dielectric material.

The reason why the polarizing angles of the two laser beams are set so as to be inclined by the same angle toward the opposite directions with respect to the straight line extending toward sub-scanning direction is that the beam diameters in the main scanning direction and the sub-scanning direction are equalized at the image surface while the transmittance of the light beam to be transmitted is substantially equalized to the reflectance of the light beam to be reflected.

Therefore, the polarization beam splitter surface transmits almost 100% laser beam whose polarized direction is 45° with respect to the sub-scanning direction, and the polarization beam splitter surface reflects almost 100% laser beam whose polarized direction is perpendicular to the polarized direction of the transmitted laser beam. When an angle formed between the polarized direction of the incident laser beam and the straight line extending toward the sub-scanning direction is set to a, components of $\cos(\alpha-45°)$ are reflected and transmitted respectively. The a does not always become 45°, and the a is slightly shifted from 45° depending on difference of the installation angle of the laser diode array.

For example, since the angle formed between the polarized direction of the laser beam whose beam spread is shown by a solid line in FIG. 13 and the polarized direction of the laser beam which is transmitted through the polarization beam splitter 12 is $(\alpha-45°)$, the component of $\cos(\alpha-45°)$ is transmitted in the incident light beam, and the remaining component of the incident light beam is reflected.

In FIG. 13, since the angle formed between the polarized direction of the laser beam whose beam spread is shown by dashed lines and the polarized direction of the laser beam which is reflected by the polarization beam splitter 12 is $(\alpha-45°)$, the component of $\cos(\alpha-45°)$ is reflected in the incident light beam, and the remaining component of the incident light beam is transmitted.

Figure 14:
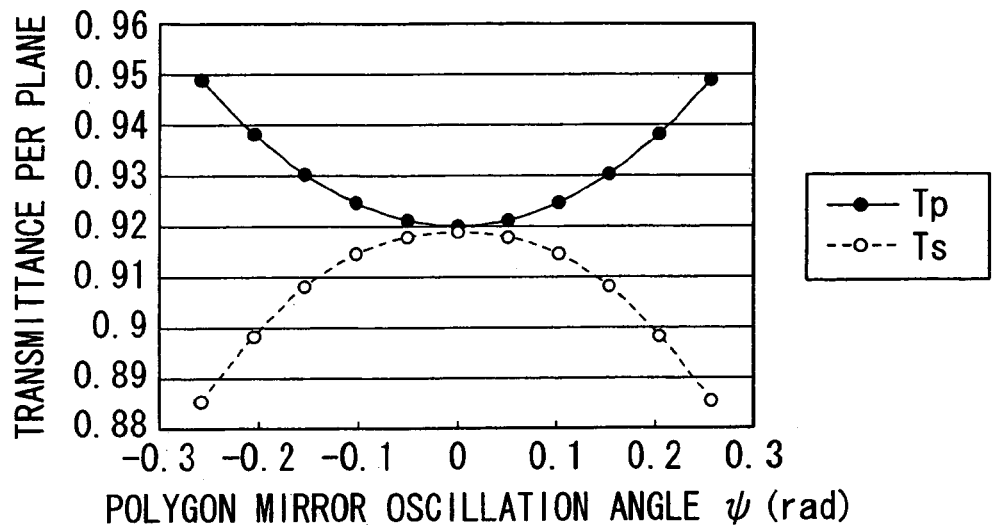
FIG. 14 is a graph showing a relationship between a polygon mirror swing angle and transmittance.

Since the light beam outgoing from the polarization beam splitter 12 while the polarized direction is inclined by about 45° with respect to the sub-scanning direction, even if the outgoing light beam is transmitted through the transmission optical system after deflected by the optical deflection device 5, the light beam has small angle dependence of the transmittance. This is because curves of the angle dependence of the transmittance in a P wave and an S wave are shown in FIG. 14 and the angle dependence of the transmittance becomes substantially an average value of these curves for the light beam whose polarizing angle is inclined by 45° to suppress a fluctuation in transmittance.

The light beams have the symmetric relation with respect to the sub-scanning direction in the above description, and it is desirable that the light beams have the symmetric relation with respect to the main scanning direction in order to obtain the good beam intensity distribution.

In the optical deflection device 5, the polarized directions are different from each other in the light beams adjacent to each other by forming the symmetric relation between the light beams with respect to the sub-scanning direction.

Figure 1:
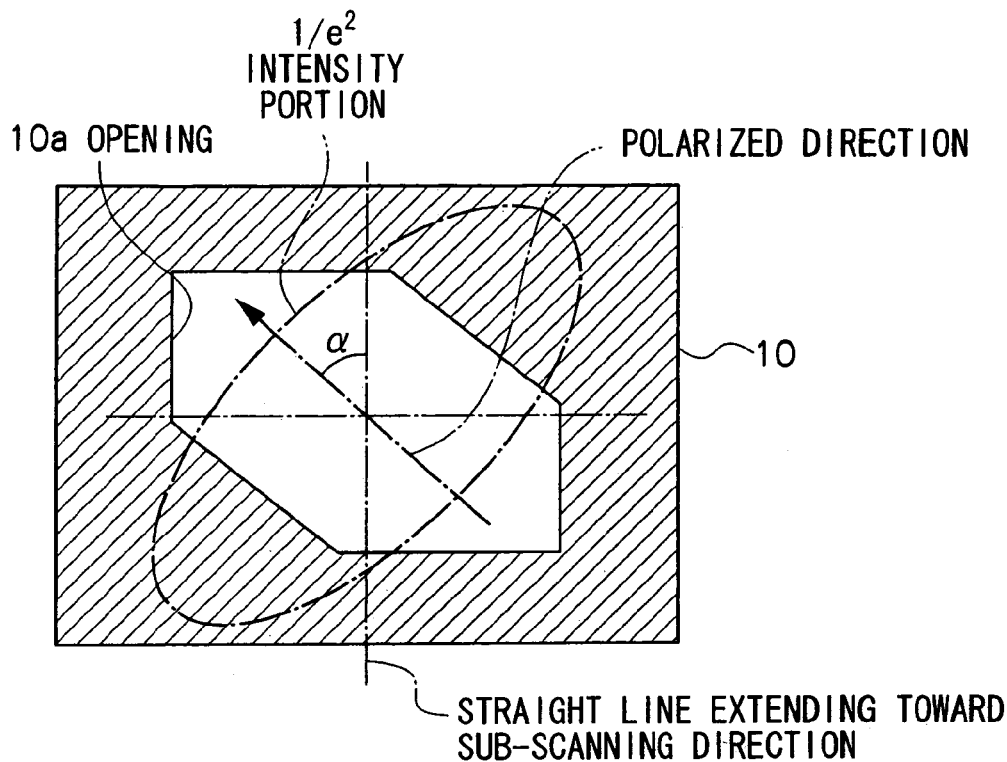
FIG. 1 is a plan view showing an aperture according to an embodiment of the invention.
Figure 15:
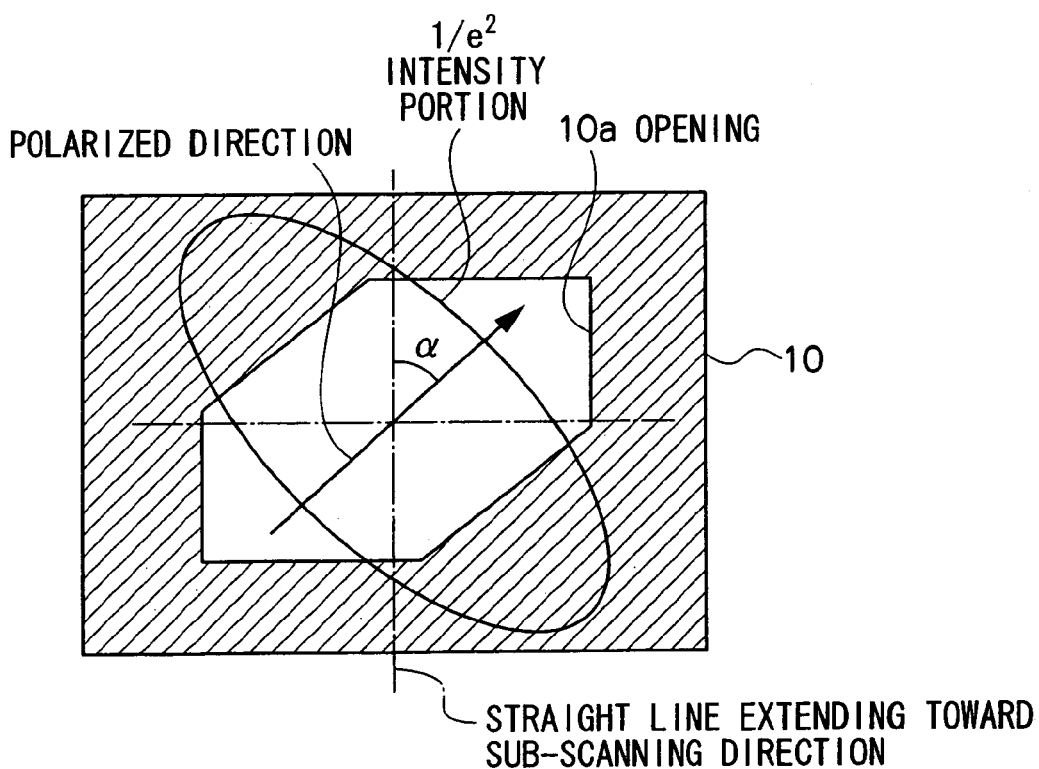
FIG. 15 is a plan view showing the aperture according to an embodiment of the invention.
Figure 2A:
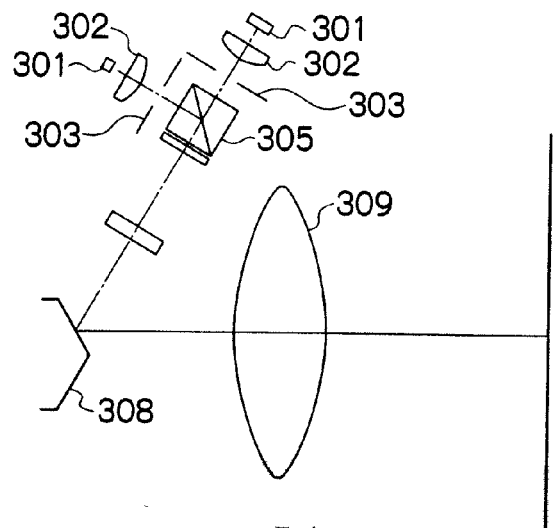
FIGS. 2a and 2b are schematic plan views showing the conventional optical multi-beam scanning device.
Figure 2B:
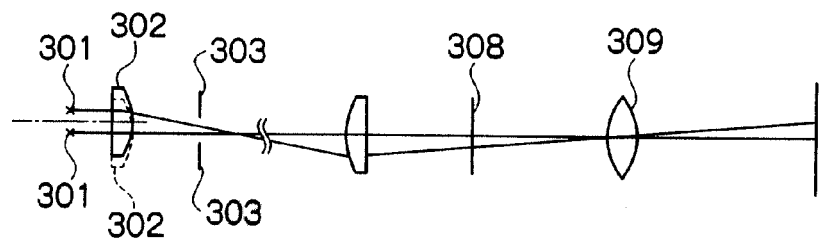
Figure 3:
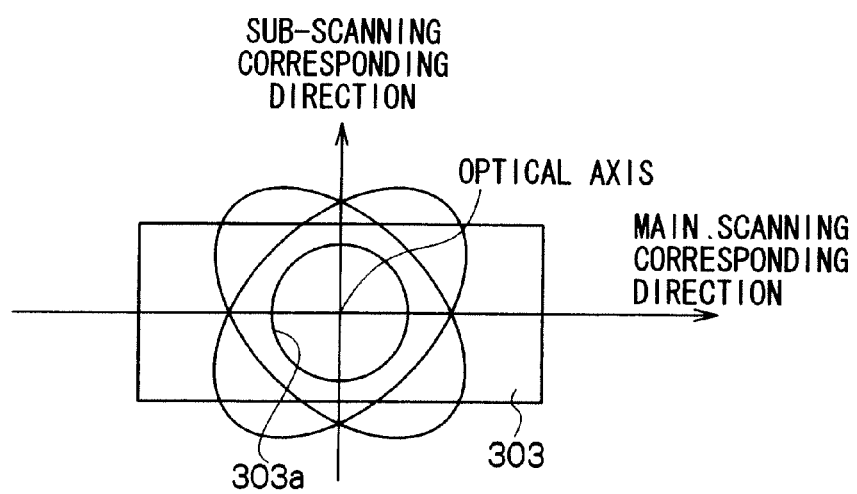
FIG. 3 is a schematic side view showing the conventional optical multi-beam scanning device.

The aperture 10 is formed as follows:

As shown in FIGS. 1 and 15, an opening 10a of the aperture 10 is formed in a long hole, a line of apsides direction of the long opening 10a is formed longer than an area of the laser beam while set to the polarized direction (minor axis) of the laser beam from the light source. Specifically, when the area is defined by $1/e^2$ for peak intensity of the laser beam, the line of apsides direction of the opening 10a is formed while broadened to the outside of the area. This is because that the shape of the outgoing laser beam is formed by taking in the laser beam leaking out beyond the area in the minor direction of the laser beam while the both end portions in the line of apsides direction of the laser beam are cut in the area defined by $1/e^2$ for the peak intensity of the laser beam. In the line of apsides direction of the oval area defined by $1/e^2$ for the peak intensity of the laser beam, the laser beam is formed while narrowed to the inside of the opening 10a.

The opening 10a of the aperture 10 is formed in a hexagonal shape. Both sides in the minor axis direction of the opening 10a are set in parallel with each other while having the substantially same size as a width in the minor axis direction of the laser beam. The line of apsides directions of the opening 10a are formed in a triangle. When the shape or the size of the triangle is changed, the image-surface beam intensity is changed in small step. Therefore, the point where the image-surface beam intensity becomes the good state is found by finely adjusting the shape or the size of the triangle. The point where the laser beam intensity becomes $1/e^2$ for the peak intensity in the cross-sectional intensity distribution is indicated by the dashed lines. The area defined by $1/e^2$ for the peak intensity has the oval shape inclined with respect to the sub-scanning direction. The polarized direction is set to an arrow direction of the dashed lines, namely the minor axis direction of the oval.

When the intensity distribution is a Gaussian distribution, when the opening diameter of the aperture and the image-formation relations (object point, image surface, lens focal point, lens position, and aperture position) are equal, it is known that the beam diameter is decreased at the image surface as the diameter of $1/e^2$ of the Gaussian distribution incident to the aperture is increased. In the embodiment, this means that the beam diameter in the predetermined direction at the image surface corresponding to the line of apsides direction of the inclined oval shape becomes small with respect to the beam diameter at the image surface corresponding to the minor axis direction when the shape of the opening is symmetric with respect to the straight line which passes through the optical axis to extend toward the sub-scanning direction. In order to increase the symmetry at the image surface, it is necessary to decrease the beam diameter in the predetermined direction at the image surface corresponding to the minor axis direction of the oval inclined at the aperture surface.

On the other hand, when the intensity distribution incident to the aperture and the image-formation relations are constant, it is also known that the beam diameter is decreased at the image surface as the opening diameter of the aperture is increased.

The opening of the aperture is broadened to the outside of the area defined by $1/e^2$ for the peak intensity in the minor axis direction of the oval laser beam, and the beam diameter is decreased in the direction corresponding to the minor axis direction of the oval shape. Therefore, the asymmetry of the intensity distribution caused by the asymmetry of the intensity distribution at the aperture surface can be eliminated at the image surface.

Based on this idea, during the procedure of finding the point where the image-surface beam intensity distribution becomes the good state, it is confirmed that the symmetries in the main scanning direction and the sub-scanning direction are increased by forming the opening of the aperture while the opening is broadened to the outside of the area defined by $1/e^2$ for the peak intensity in the minor axis direction of the oval laser beam. The result is the shape shown in FIGS. 1 and 15.

Then, the image-surface beam intensity distribution for the shape of the opening 10a of the aperture 10 having the above described configuration is examined.

Figure 16:
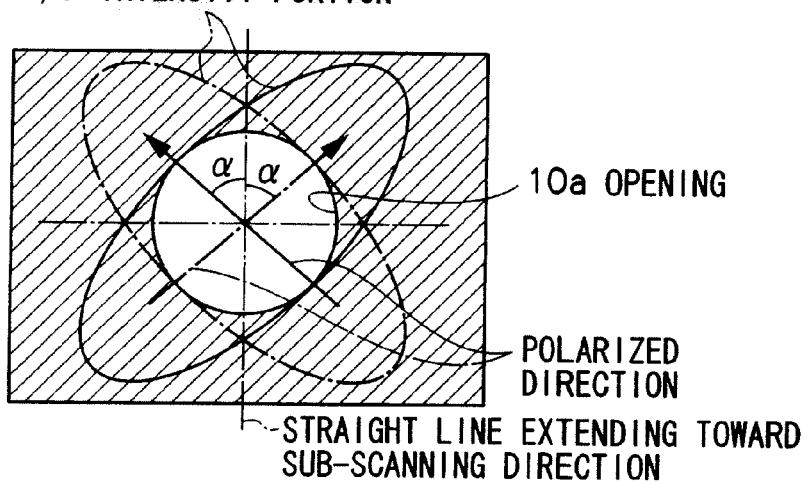
FIG. 16 is a plan view showing the conventional aperture.
Figure 17:
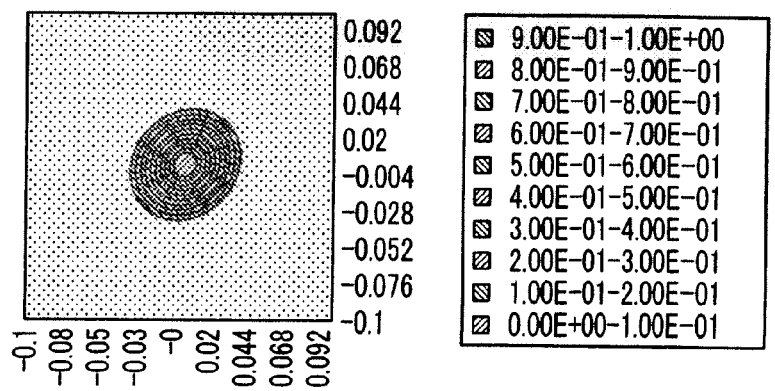
FIG. 17 is a graph showing an image surface beam intensity distribution by the conventional aperture.

For the purpose of comparison to the image-surface beam intensity distribution of the opening 10a of the aperture 10, the image-surface beam intensity distribution of the opening shape of the conventional aperture is also examined. FIGS. 16 and 17 show an example of the image-surface beam intensity distribution of the opening shape of the conventional aperture. In this case, as shown in FIG. 16, the opening of the conventional aperture is formed larger than the opening in the related art described in the cited document 1 (the opening is formed up to the limit of the portion where two light beams overlap each other), and the image-surface beam intensity distribution is examined. Accordingly, the result shown in FIG. 17 is obtained. In the spread angle of the laser beam, it is set that $\theta_\perp=20°$ and $\theta_{//}=10°$. The opening is formed in a circle having the diameter of $1/e^2$ in the $\theta_{//}$ direction. At this point the optical efficiency becomes 29% due to vignetting, and the intensity distribution is inclined as shown at the image surface in FIG. 17. FIG. 17 shows the intensity distribution at the image surface with contour lines. A horizontal axis indicates the main scanning direction position, and a vertical axis indicates the sub-scanning direction position.

Figure 18:
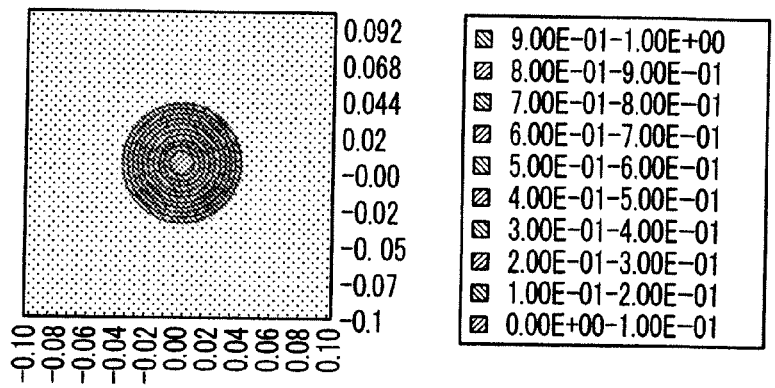
FIG. 18 is a graph showing the image surface beam intensity distribution by the aperture according to an embodiment of the invention.

On the contrary, FIG. 18 shows the image-surface beam intensity distribution of the opening 10a of the aperture 10 according to the embodiment. In this case, the transmittance becomes 34%. The transmittance of the aperture 10 according to the embodiment is larger than that of the conventional aperture. Further, the aperture 10 according to the embodiment is superior to the conventional aperture in the symmetries in the main scanning direction and the sub-scanning direction of the intensity distribution at the image surface. The polarized direction of the laser beam outgoing from the polarization beam splitter is inclined by 45° with respect to the sub-scanning direction, namely the laser beam has the intermediate transmittance between the P wave and the S wave, so that the unevenness of the light quantity by the angle dependence of the transmittance generated in the post-deflection optical system can be decreased. When the asymmetries in the main scanning direction and sub-scanning direction of the intensity distribution is strong at the image surface, in writing the straight line during the latent image formation, sometimes the thickness of the line and depressions and projections of the line are different depending on the direction and the image quality is degraded.

However, this can be eliminated by improving the symmetries in the main scanning direction and sub-scanning direction of the intensity distribution. In both the cases of the apertures shown in FIGS. 1 and 15, the same results as FIG. 18 are obtained.

The aperture 10 having the above-described configuration is provided on the side of the light source 3 of the polarization beam splitter 12 to narrow the laser beams before the laser beams are combined by the polarization beam splitter 12. It is also possible to narrow the laser beams after the laser beams are combined by the polarization beam splitter 12. In this case, the aperture 10 is formed as shown in FIG. 19. The shape of an opening 10b of the aperture 10 is formed in the shape the openings 10a shown in FIGS. 1 and 15 are combined.

As shown in FIG. 19, in order to increase the transmittance, an inner hole of the aperture is formed larger than the area defined by $1/e^2$ for the peak intensity of the laser beam. In this case, as shown in FIG. 20, the beam intensity distribution becomes asymmetric at the image surface with respect to the main scanning direction and the sub-scanning direction. However, the transmittance efficiency by the vignetting is increased to 41%.

When the normal half mirror is used in combining the light beams, the light quantity of the outgoing light beam becomes lower than the half of the light quantity of the incident light beam. When the polarized directions of the light beams are different from each other, the light quantity of the outgoing light beam can become more than the half of the light quantity of the incident light beam by utilizing the element in which the transmittance and the reflectance largely depend on the polarized direction. When the polarized directions are different by 90° from each other, the efficiency can be maximized.

The expensive wave plate is not used, or only one quarter-wave plate is used after the combination of the laser beams, so that cost reduction can be realized.

In the optical multi-beam scanning device 1, the aperture 10 is provided while the polarized directions of the laser beams are arranged so as to have the symmetric relation or the substantially symmetric relation with respect to the straight line extending toward the sub-scanning direction. However, it is possible that the aperture 10 is not provided. When the latent image is formed by the laser beams which are symmetric with respect to the sub-scanning direction without providing the aperture 10, the laser beams which are symmetric with respect to the sub-scanning direction draw the line which has the same state in the main scanning direction. Namely, even if the laser beams are symmetric with respect to the sub-scanning direction and inclined, both the laser beams draw the line which has the same state in the main scanning direction while the laser beams are symmetric with respect to the sub-scanning direction, and the problems such as the unevenness of the light quantity are not generated. Although it is difficult to draw the thin line, the latent image in which the unevenness of the light quantity is not generated can be formed. Accordingly, the quarter-wave plate and the aperture 10 are not used, so that the cost reduction can be realized.

When the laser beams are circularly polarized after the laser beams are combined by the polarization beam splitter 12, sometimes the quarter-wave plate is provided in the optical path after the laser beams are combined by the polarization beam splitter 12.

Second Embodiment

Then, a second embodiment of the invention will be described. The single-drum type monochrome printer (monochrome image forming apparatus) in which the two-beam optical scanning device is utilized will be described in the second embodiment.

Figure 21:
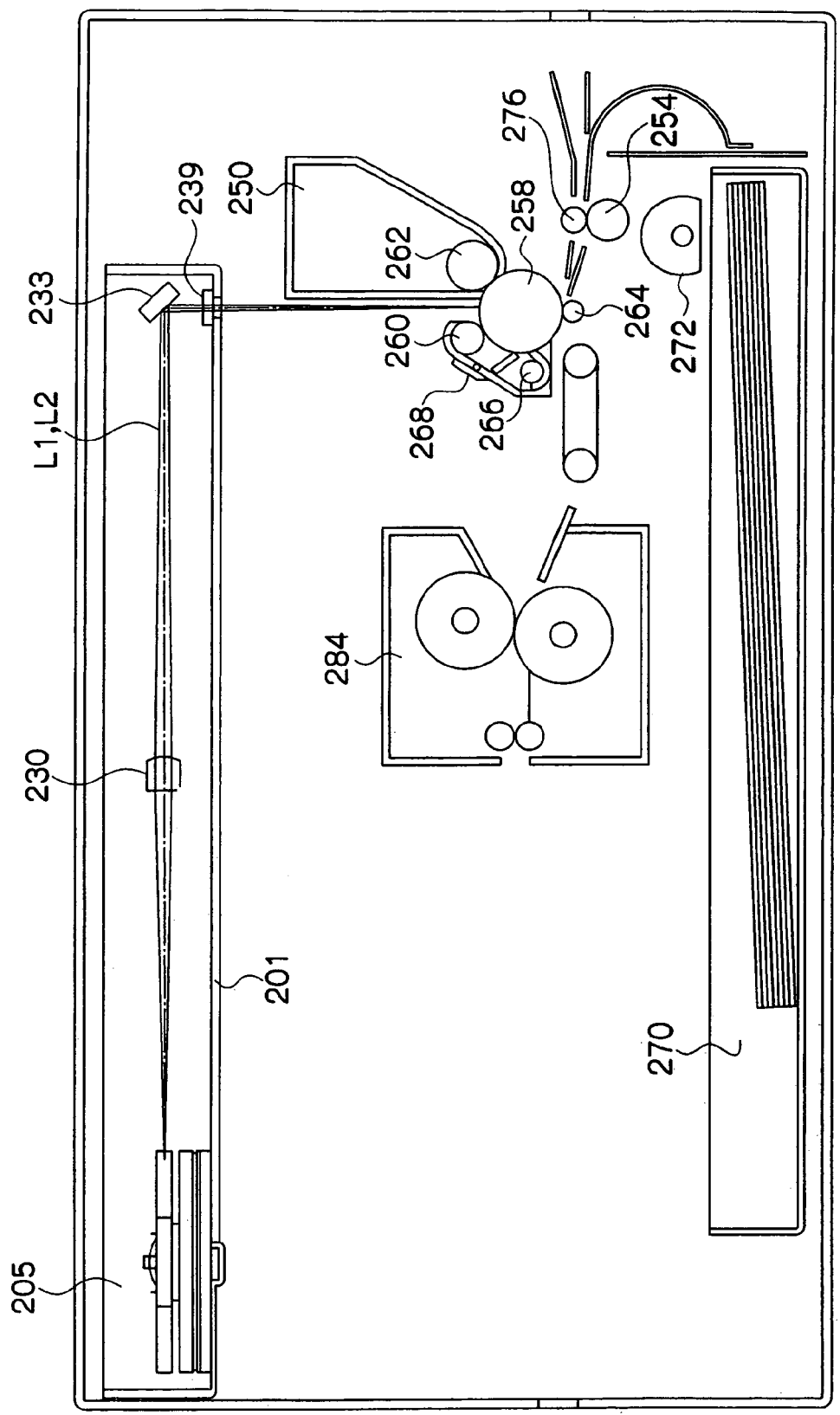
FIG. 21 is a schematic sectional view of the image forming apparatus according to a second embodiment of the invention.

FIG. 21 shows the single-drum type monochrome printer (monochrome image forming apparatus) in which the two-beam optical scanning device according to the second embodiment of the invention is utilized.

As shown in FIG. 21, an image forming apparatus 200 has an image forming unit 250 adopting the well-known laser beam printer method.

The image forming unit 250 is arranged at the position where laser beams L1 and L2 are output through a reflecting mirror 233 of a light-beam scanning device 201 which is described later referring to FIGS. 22 and 23.

The image forming unit 250 is formed in a cylindrical drum shape while can be rotated in a predetermined direction, and has a photoconductor drum 258 on which an electrostatic latent image corresponding to each image is formed. A charging device 260, a development device 262, a transfer device 264, a cleaner 266, and a charge removal device 268 are arranged around the photoconductor drum 258 in the order along the rotating direction of the photoconductor drum 258. The charging device 260 provides a predetermined potential to the surface of the photoconductor drum 258. The development device 262 performs the development by providing the color toner corresponding to the electrostatic latent image formed on the surface of the photoconductor drum 258. The transfer device 264 is opposed to the photoconductor drum 258 through a conveyance belt 252, and the transfer device 264 transfers the toner image on the photoconductor drum 258 to the conveyance belt 252 or the recording medium, namely the recording paper P conveyed through the conveyance belt 252. The cleaner 266 removes the toner remaining on the photoconductor drum 258 after the toner image is transferred through the transfer device 264. The charge removal device 268 removes the potential remaining on the photoconductor drum 258 after the toner image is transferred through the transfer device 264.

The laser beams L1 and L2 guided by the mirror 233 of the light-beam scanning device 201 are incident between the charging device 260 and the development device 262.

A paper cassette 270 is arranged below the photoconductor drum 258. The recording medium, namely the recording paper P, to which the image formed by the image forming unit 250 is transferred, is stored in the paper cassette 270.

A substantially semilunar shaped paper feed roller 272 is arranged at one end of the paper cassette 270 and on the side close to a tension roller 254. The paper feed roller 272 takes out the recording paper P stored in the paper cassette 270 one by one from a top of a stack of recording paper P. A registration roller 276 is arranged between the paper feed roller 272 and the photo conductor drum 258. The registration roller 274 aligns the front end of one piece of recording paper P taken out from the paper cassette 270 and the front end of the toner image formed on the photoconductor drum 258.

A fixing device 284 is arranged in the direction in which the recording paper P is conveyed. The image which is formed in the photoconductor drum 258 is transferred to the recording paper P by the transfer device 264. In the fixing device 284, the toner image transferred to the recording paper P is fixed to the recording paper P.

Figure 23:
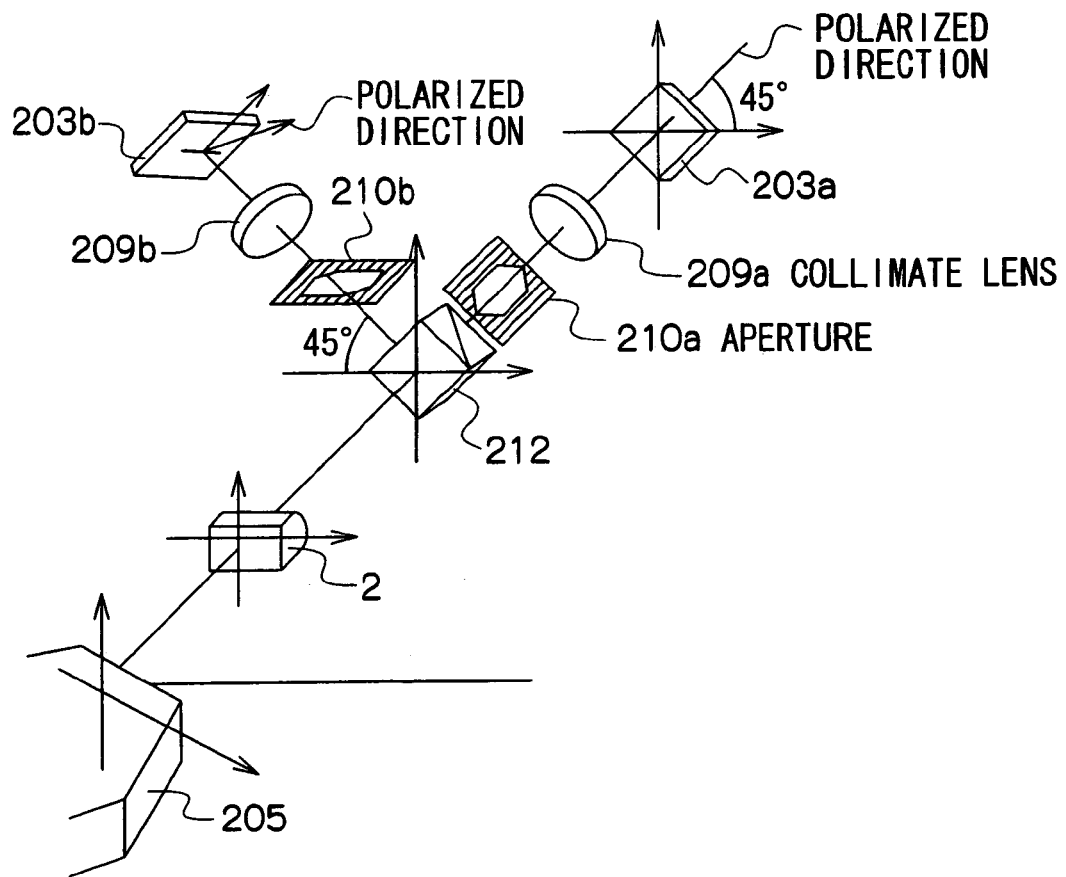
FIG. 23 is a schematic perspective view showing the arrangement of optical members of the optical multi-beam scanning device incorporated into the image forming apparatus shown in FIG. 21.
Figure 22:
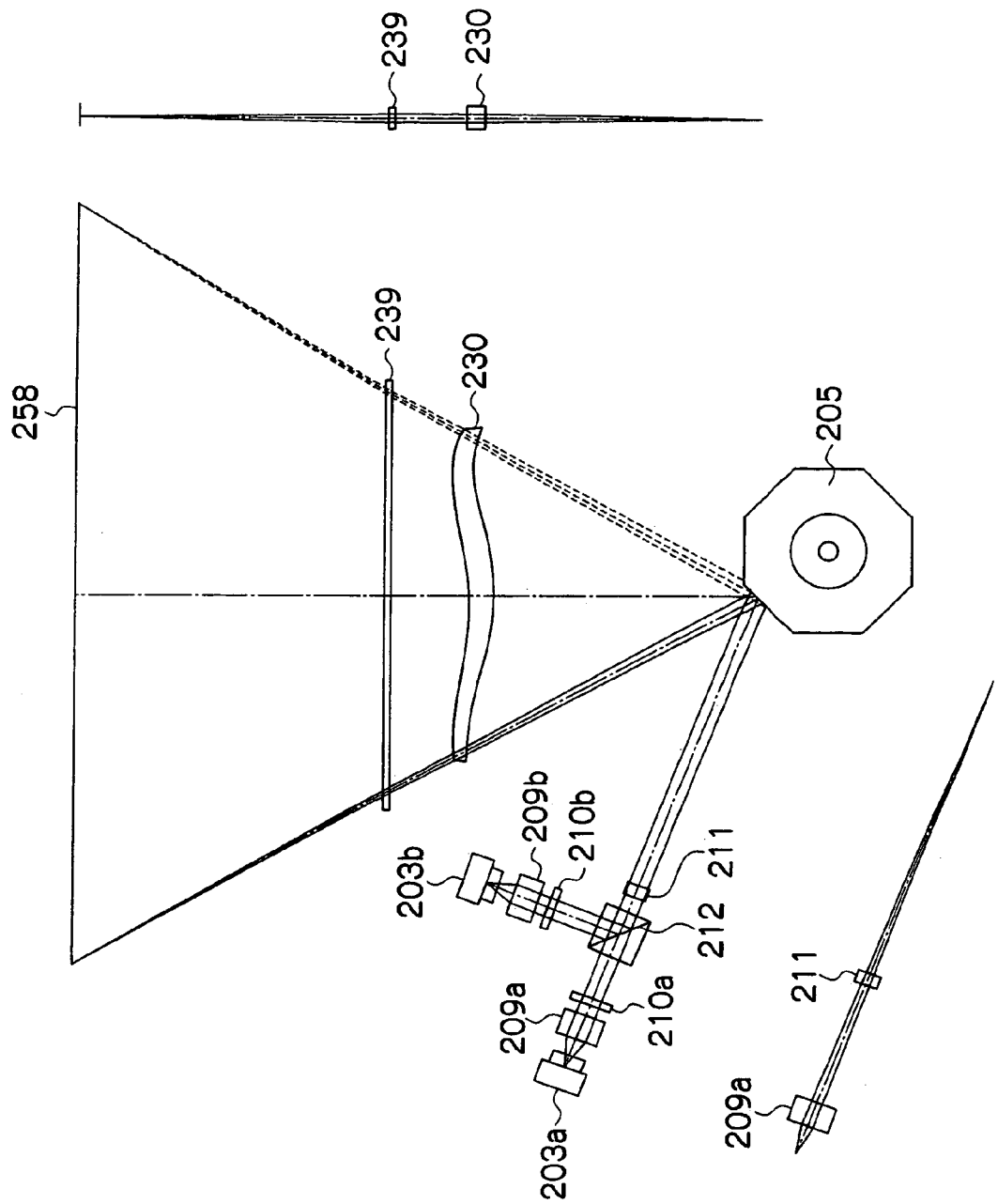
FIG. 22 is a schematic plan view showing the arrangement of optical members of the optical multi-beam scanning device incorporated into the image forming apparatus shown in FIG. 21.

FIGS. 22 and 23 show the two-beam optical scanning device which is used for the image forming apparatus shown in FIG. 21.

As shown in FIGS. 22 and 23, the light-beam scanning device 201 has only one optical deflection device 205 which is of the deflection means. The optical deflection device 205 deflects the two (Ni=2) laser beams emitted from first and second light elements 203a and 203b as the light sources toward the predetermined position in the image surface arranged at the predetermined position at predetermined linear velocity. Herein after the direction in which the laser beam is deflected by the optical deflection device 205 will be shown as the main scanning direction.

Only one image-formation lens 230 is arranged between the optical deflection device 205 and the image surface. The image-formation lens 230 imparts predetermined optical characteristics to the first and second laser beams which are deflected toward the predetermined direction by the reflecting surface of the optical deflection device 205. A dust-proof glass 239 is arranged between the image-formation lens 230 and the image surface.

Then, the pre-deflection optical system between the laser element which is of the light source and the optical deflection device 205 will be described in detail.

The light scanning device 201 has M groups of light sources 203 (M is a positive integer, and M is 1 in this case) which includes two laser elements which satisfy Ni=2.

A collimate lens 209a, an aperture 210a, a polarization beam splitter 212, and a hybrid cylindrical lens 211, which form the pre-deflection optical system, are arranged between the first laser 203a of the light source 203 and the optical deflection device 205. A second laser 203b, a collimate lens 209b, and an aperture 210b are arranged in the opposite surface to the surface to which the laser beam L1 from the first laser 203a is incident in the polarization beam splitter surface of the polarization beam splitter 212. The optical characteristics, the shape, the material, and the like of each optical element used for the pre-deflection optical system are substantially equal to the first embodiment, so that the detail description is not repeated.

In the monochrome printer having the above-described configuration, as with the light source 3 in the first embodiment, the light source 203 is arranged so that the polarized directions of the two laser beams have the symmetric relation or the substantially symmetric relation with respect to the straight line extending toward the sub-scanning direction while the two laser beams are combined by the polarization beam splitter 212 to overlap each other.

Similarly, the opening of the aperture 210 is formed in the long hole shape. The line of apsides direction of the long opening is aligned to the polarized direction (minor axis direction) of the laser beam from the light source, and the line of apsides direction of the long opening is formed while broadened to the outside of the area of the laser beam. Specifically, when the area is defined by $1/e^2$ for the peak intensity of the laser beam, the opening is formed while broadened to the outside of the area defined by $1/e^2$ for the peak intensity of the laser beam.

In this case, the same action and effect as the first embodiment can be achieved.

What is claimed is:

1. An optical multi-beam scanning device which forms a plurality of latent images, the device comprising:

a first plurality of laser diodes which are arranged while junction surfaces of the laser diodes are inclined toward the same direction with respect to a sub-scanning direction;

a second plurality of laser diodes whose junction surfaces are inclined toward the opposite direction to the inclined direction of the junction surfaces of the first laser diodes while the inclined angle of the junction surfaces of the second laser diodes is equal to the inclined angle of the junction surfaces of the first laser diodes; and an optical path combining optical element which has polarization beam splitter surfaces for combining all the light beams, wherein the light beams emitted from the first laser diodes are incident to one of the polarization beam splitter surfaces with different heights in the sub-scanning direction in each light beam which forms a different latent image, the light beams emitted from the second laser diodes are incident to the different surface of the polarization beam splitter surfaces with different heights in the sub-scanning direction in each light beam which forms the different latent image, and polarized directions of the light beams which are adjacent to one another on the polarization beam splitter surface and form the different latent images are different from one another.

2. An image forming apparatus comprising:

optical scanning means for forming a latent image; and development means for performing development by supplying toner to the latent image formed by the optical scanning means, wherein the optical scanning means is formed by an optical multi-beam scanning device which forms a plurality of latent images, the device comprising:

a first plurality of laser diodes which are arranged while junction surfaces of the laser diodes are inclined toward the same direction with respect to a sub-scanning direction;

a second plurality of laser diodes whose junction surfaces are inclined toward the opposite direction to the inclined direction of the junction surfaces of the first laser diodes while the inclined angle of the junction surfaces of the second laser diodes is equal to the inclined angle of the junction surfaces of the first laser diodes; and an optical path combining optical element which has polarization beam splitter surfaces for combining all the light beams, wherein the light beams emitted from the first laser diodes are incident to one of the polarization beam splitter surfaces with different heights in the sub-scanning direction in each light beam which forms a different latent image, the light beams emitted from the second laser diodes are incident to the different surface of the polarization beam splitter surfaces with different heights in the sub-scanning direction in each light beam which forms the different latent image, and polarized directions of the light beams which are adjacent to one another on the polarization beam splitter surface and form the different latent images are different from one another.

* * * * *